United States Patent [19]
Dickson

[11] Patent Number: 5,295,238
[45] Date of Patent: Mar. 15, 1994

[54] SYSTEM, METHOD, AND FONT FOR PRINTING CURSIVE CHARACTER STRINGS

[75] Inventor: Nathan A. Dickson, Powell, Ohio

[73] Assignee: Highlights for Children, Inc., Columbus, Ohio

[21] Appl. No.: 693,385

[22] Filed: Apr. 30, 1991

[51] Int. Cl.⁵ .............................................. G06F 15/62
[52] U.S. Cl. ..................................... 395/150; 395/145
[58] Field of Search .......................... 395/144, 150, 151; 364/419; 400/19

[56] References Cited

U.S. PATENT DOCUMENTS

| | | | |
|---|---|---|---|
| 4,181,972 | 1/1980 | Casey | 395/144 |
| 4,244,657 | 1/1981 | Wasylyk | 400/109 |
| 5,109,352 | 4/1992 | O'Dell | 395/150 |
| 5,119,296 | 6/1992 | Zheng et al. | 364/419 |
| 5,131,090 | 7/1992 | Fukushima | 364/419 |
| 5,131,766 | 7/1992 | Wong | 364/419 |
| 5,137,383 | 8/1992 | Wong | 364/419 |

FOREIGN PATENT DOCUMENTS

59-230754 12/1984 Japan .

Primary Examiner—Gary V. Harkcom
Assistant Examiner—N. Kenneth Burraston
Attorney, Agent, or Firm—Mueller and Smith

[57] ABSTRACT

A mathematically describable outline font and system for generating cursively concatenated text output using context-sensitive letter forms drawn from a single, standard ASCII character set. In creating such letter forms, each letter of the alphabet, is reduced to its basemost, non-context-sensitive form and joined by context dependent connector characters, as determined upon base letterform pairs. Special characters and connectors are also substituted in the presence of predetermined adjacent character pairs, providing an unbroken sequence of output characters which simulates human cursive handwriting as taught by the Zanerian method. Unlike script fonts currently available in the art which rely on overlapping or disjointed connector components in an attempt to simulate handwriting, the font and system of type generation disclosed by the present invention produces electronically set type having interconnected cursive characters and a common stroke width.

22 Claims, 9 Drawing Sheets

FIG. 4A
PRIOR ART
type ← 100

FIG. 4B
*type* ← 102

FIG. 4C
*type* ← 106

SYSTEM, METHOD, AND FONT FOR PRINTING CURSIVE CHARACTER STRINGS

BACKGROUND OF THE INVENTION

The present invention relates to a mathematically definable outline character font and character generating system having particular, but not necessarily exclusive, application in electronic printing and/or visual displays.

Until recently, the bulk of typesetting was accomplished using photo-mechanical means. Typically performed on photo-compositors, this method of generating type is generally limited to 24 words per hour since each typeset character involves exposure through a film strip onto an underlying sheet of photosensitive paper. Once text has been fully exposed onto the photographic paper, the paper is then developed and subsequently positioned and affixed to a layout page. After layout is complete the page is then rephotographed with the resulting negative being retouched prior to creating an offset plate for printing to remove unwanted lines and marks that often appear on the negative.

The mechanics of typesetting and layout are undergoing significant changes. While photo-mechanical approaches are still being employed by many to typeset, their use is rapidly being replaced by a newer, electronic imagesetting technology. Faster and less expensive computers, and their associated input and storage devices and the availability of more sophisticated type generating software has brought the ability to produce high-resolution documents within the reach of more users than previously possible. Electronic layout, which enables a layout artist to electronically manipulate digitized images and text on a video display screen prior to printing it, eliminates the bulk of the mechanical layout effort. Using electronic layout techniques, a final layout may be output directly to a laser printer or to a high-resolution photographic imagesetting device without the need for the intermediate paste-up and photographic steps. Yet, however convenient electronic typesetting may be, it is viable as an alternative to other typesetting methods only if the perceivable typographic quality is comparable to that previously rendered by the slower photo-mechanical technique.

Several methods are available for electronically encoding a typeface including storing characters as bit maps and storing as mathematical descriptions of the characters' outlines. Since outline fonts are generally output device independent and offer a greater degree of resolution, they are the preferred choice for imagesetting applications. Currently the most widely accepted method for describing outline character fonts is a page description language called PostScript ® by Adobe Systems. PostScript provides a means for describing and storing the graphical attributes of individual typeface characters mathematically as a combination of arcs, lines, curves and control points. Once defined, each character may be assigned a unique identifying number (0-255) conforming to a location in an ASCII character table for subsequent retrieval by an input device. Since outline characters are precisely described as a combination of mathematical elements, proportional sealing or digital manipulation may be performed without loss of the character's mathematically described features. In the above regard, reference is made to the following technical publication: "PostScript Language Reference Manual", Adobe Systems, Incorporated, Addison-Wesley Publishing Co., Inc. 1986.

Subsequent to being retrieved from their character table, a character outline may be filled to provide a solid font character for printing. Once the characters are filled they are prepared for printing using a rasterizing technique. Rasterizing produces a stream of data that when sent to a printer, such as a laser printer or imagesetter, yields a filled representation of the character outline stored in the font character table. Because of their mathematical nature, outline fonts may be sent to any output device equipped with suitable language interpreter, their resolution being limited only by the physical limitations of the rastering device.

As a result of the increased demand for electronic typesetting, literally thousands of outline fonts have been either created or derived from existing, mechanical typefaces using digitizing devices and outline font generating software available in the art, such as Fontographer ® by Altsys. Font generating software converts hand sketched or traced character images into mathematical PostScript descriptions of the characters' outlines. After a complete set of characters in a typeface is converted, the collection is assigned a unique PostScript font identification number. When creating an electronic font, the spatial relationship, between adjacent characters may be just as critical as the description of the character itself. To accommodate situations where a character may change depending upon the context of its use, i.e., its context-sensitivity, electronic fonts may provide kerned pairs, ligatures, and composite character elements, such as accents. While not generally visible on a standard ASCII keyboard, these special characters are generally invokable by their ASCII address entered through a sequence of keystrokes on a keyboard.

A truly context-sensitive cursive typeface converted to an outline font will produce some characters with more than one outline description. For example, a context-sensitive, lower case "e" will appear in numerous forms depending upon its placement within a word and with which adjacent character it is connected. An e at the beginning of a word may differ form an e falling at the end of a word. So too, an e following a b has a differently shaped bowl and connecting point than an e that connectingly succeeds an l. Compounding the problem is the fact that both cases of a typeface, i.e., 52 alphabetic letters plus special, accented forms, must be considered. Consequently, if an outline character was generated for each possible permutation of a character based upon its contextual relationship, the font character table would soon become unmanageable by quickly exceeding the total of 256, the maximum number of characters available in a single font character table and addressable from a standard ASCII keyboard.

Examination of the art of mechanical typesetting discloses a plethora of typefaces with the two basic typeface families being manuscript and cursive. Cursive, sometimes referred to as script, is usually intended to emulate human handwriting. As such, a cursive type style relies heavily on context-sensitive characters, that is, character letter forms that change depending upon the characters with which they are joined. This is especially true with the Zaner-Bloser typeface which has, since the late 1800's, been used to instruct pupils in Zanerian method of correct cursive penmanship by creating exemplars for pupils to mimic. This familiar typeface uses a series of interconnected flowing strokes and curves to produce a pleasing handwriting display while accommodating the limited motor skills of the beginning cursive handwriting student.

Since the number of character variations required to produce a context-sensitive cursive type style exceeds the standard ASCII character set of 256, past efforts to create a context-sensitive outline font have relied on the creation of numerous, related fonts, each containing only a portion of the entire cursive character set. In setting context-sensitive type, appropriate characters would have to be selected from several different fonts depending upon its typographical environment. Therefore, to set cursive type using a PostScript outline fonts, more than one font had to be downloaded to the PostScript printing device for a given block of text. In addition to being awkward to implement, the use of multiple outline fonts to represent a single character set is both time consuming and an inefficient use of memory in the PostScript printing device which generally stores bit-mapped renditions of the downloaded fonts in the printer's memory.

It is the generation of a context-sensitive cursive outline font which may be stored in a single standard ASCII character table to which the present invention is addressed.

SUMMARY OF THE INVENTION

The present invention provides a mathematically described font and system for generating cursive text using context-sensitive letter forms drawn from a single, standard ASCII character set. In creating such letter forms in accordance with the current invention, each character of the alphabet, both upper case and lower case, is reduced to its basemost, non-context-sensitive form. Context dependent connector characters, special characters, and special character pairs are generated which provide for joining adjacent characters at identifiable concatenation points to provide an unbroken sequence of output characters which simulates human cursive handwriting as taught by the Zanerian method. Unlike the method employed by classic typesetting methods, wherein each permutation of a character within a context-sensitive cursive typeface was represented by an individual character having its own unique connector, the present invention accomplishes an improved output while employing a minimum, and much more manageable, number of character components. Differing from script fonts currently available in the art which rely on overlapping or disjointed connector components in an attempt to simulate handwriting, the font and system of type generation disclosed by the present invention produces electronically set type having sequentially concatenated cursive characters.

One feature of the invention is a system for forming a visually perceptible context sensitive sequence of cursively concatenated font characters from a string of input characters, which includes an electronically accessible memory, having a first memory component retaining definitions for printed information of base letter forms, a second memory component retaining definitions for printed information of connector forms, a third memory component retaining a first family of character groups of connector forms, a third memory component retaining a first family of character groups associated with respect to common connector forms in adjacency with and to the left of another character, and a fourth memory component retaining a second family of character groups associated with respect to common connector forms in adjacency with another character. An input arrangement is provided for supplying a sequence of input signals identifying the string of input characters. A processor is responsive to the input signals for accessing the third and fourth memory components to locate data representing the presence of mutually adjacent ones of the input characters within the first and second families of character groups for accessing the second memory component to derive a definition of a connector form corresponding with the located data, for accessing the first memory component to derive a definition of a base letter form for each of the mutually adjacent ones of the input characters, and for deriving output signals corresponding with a cursively concatenated sequence of derived definitions of the base letter forms and the derived definition of the connector form. Further, an output arrangement is responsive to the output signals for providing a cursively concatenated visual representation corresponding with mutually adjacent ones of the input characters.

Another feature of the invention provides a method for forming a printed sequence of cursively concatenated font characters corresponding with a given string of characters, comprising the steps of:

providing a first compilation of cursive base letter forms;

providing a second compilation of cursive connector forms;

providing a third compilation of a first family of character groups in which the characters therein are uniquely associated with respect to common connector forms in adjacency with and to the left of another character, providing a fourth compilation of a second family of character groups in which the characters therein are uniquely associated with respect to common connector forms in adjacency with and to the right of another character, identifying the presence of each character within a given string of characters within character groups of first and second families and deriving data corresponding with an identified presence;

selecting a base letter form from said first compilation for the characters of the given string;

selecting a cursive connector form in correspondence with the derived data for pairs of adjacent characters within the given string of characters; and combining each the selected base letter form and the correspondingly selected connector connector form for each of the pairs of adjacent characters to provide a context cursively concatenated printout of the given string of characters.

Figure 1A:
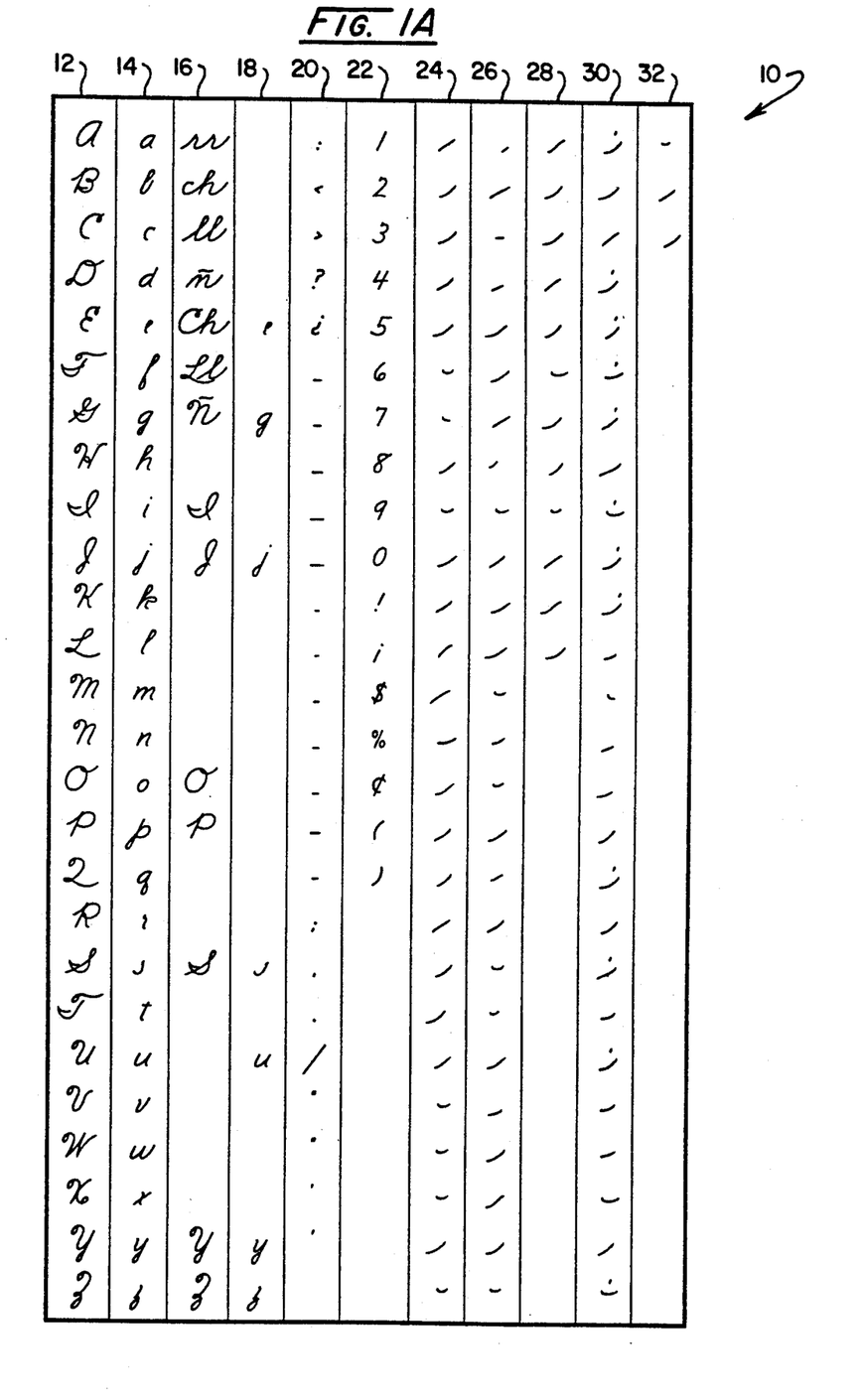
FIG. 1A is a drawing of the base letter forms, connector forms, numbers and symbols of the cursive outline font according to the present invention

Yet another feature of the invention is to provide the font of characters shown in FIG. 1A.

Other features of the invention will, in part, be obvious and will, in part, appear hereinafter.

The invention accordingly, comprises the system and method possessing the construction, combination of elements and arrangement of steps which are exemplified in the following detailed disclosure. For a fuller understanding of the nature and features of the invention, reference should be had to the following detailed description taken in conjunction with the accompanying drawings.

DETAILED DESCRIPTION OF THE INVENTION

Referring to FIG. 1A, a font of cursive characters of an alphabetic, numeric, and connecting form is revealed. From the figure, it can be observed that letter and connector forms are arranged in columnar form. The character forms therein displayed represent a visual representation of the characters in the Zaner Cursive outline font, the character definitions of which are addressably stored in a computer memory component and recallable upon demand.

The alphabetic group of characters shown in column 12 is shown to contain all 26 members of the English alphabet, from A-Z, in their upper-case form. The lower case version of the font's alphabetic letter forms are depicted in column 14 and are shown rendered in their basemost form having neither leading nor trailing character stroke elements. Certain special character combinations, composite characters and upper-case exceptions are presented in column 16. Certain lower-case base letter form exceptions are displayed in column 18, in a row corresponding to the excepted character's normal upper-and lower-case versions. Revealed in columns 20 and 22 are the numeric and symbolic elements of the Zaner Cursive font.

Looking to columns 24, 26, and 28, graphical representations of the "standard" cursive connecting stroke forms are revealed which are employed to join the majority of adjacent base letter forms. Columns 30 and 32 contain unique, "exception" versions of additional cursive connector forms, these being used to join special, pre-identified base letter form pairs. While not arranged in numerical order, each base letter and connector form visually depicted in FIG. 1A is a member of a single, 256 character ASCII set and represents a unique character description having its own unique, addressable identification number within the set.

One unique aspect of the base letter and connector forms depicted in FIG. 1A is the ability to join cursive letter forms with a predetermined connector form at predefined concatenation points along a letter form's right or left side. Such concatenation, upon implementation, produces an electronic output of sequentially connected characters which closely simulates the exemplary cursive handwriting style taught by the Zanerian Method.

Another unique aspect of the cursive font depicted in FIG. 1A is the definition of predetermined connector form exceptions, as depicted in columns 30 and 32, for joining certain of pre-identified adjacent letter form pairs. Additionally, special characters may be substituted when paired with predetermined adjacent characters in order to form a cursive construction which more readily emulates human handwriting style.

Figure 2A:
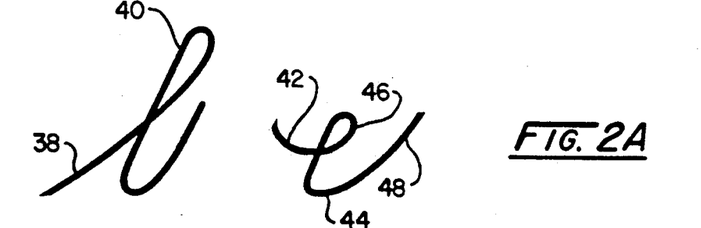
FIG. 2A is an exemplar of the joining of the lower-case cursive letter forms "b" and "e" according to the present invention.
Figure 2B:
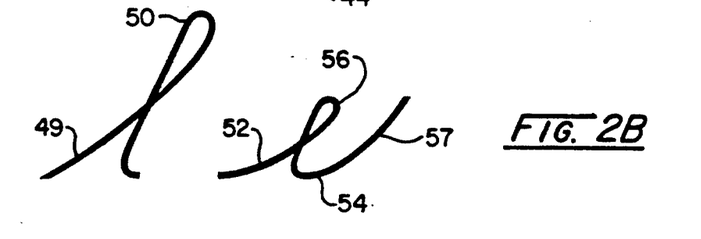
FIG. 2B is an exemplar of the joining of the lower-case cursive letter forms "l" and "e" according to the present invention.

Referring to FIG. 2A, combinations of cursive letter forms and connector forms forming the characters b and e are depicted at 40 and 44, respectively. The characters are shown separated by a space in order to draw attention to joining connector form 42 which visually connects letter forms b (40) and e (44). The bowl of the e character letter form is depicted at 46 and is shown to enclose an area. Looking additionally to FIG. 2B, the letter forms l (50) and e (54) are depicted, again, separated by a space to draw attention to a joining connector form at 52. Comparing the two connector forms 42 and 52 from FIGS. 2A and 2B respectively, it is quickly seen that, although in each case the connector joins adjacent rightward e's 44 and 54, the selected connector corresponds with the concatenation attributes of its leftwardly adjacent b and l letter forms, 40 and 50. Additionally, the variety of the e character chosen for each of the exemplars of FIGS. 2A and 2B also reflects the context in which the e characters, 44 and 54, are used. That the two e characters, 44 and 54 are different is evidenced by the size of each character bowl 46 and 56, as well as the angle of the stroke forming the bottom of each respective bowl. In this manner, it can be seen that cursive letter combination be of FIG. 2A, and Zaner cursive letter combination le of FIG. 2B each utilize base character and connector forms which are sensitive to the context, i.e., the adjacent character environment, in which they are employed.

Figure 2C:
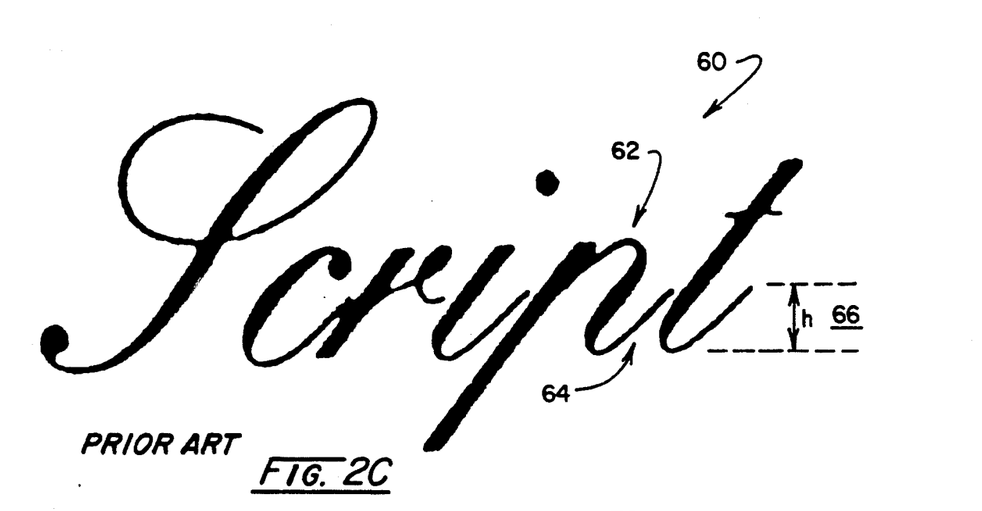
FIG. 2C is an exemplar of a cursive outline font available in the prior art displaying the word "Script"

Referring now to FIG. 2C, a graphic representation of a character string using a script-type, outline font known to the art as Künsler Script by Adobe Systems, is shown displaying the word "Script", generally at 60. Typical in the prior art where it is desired to create joined, cursive strings of type, a font will utilize letter forms, such as at the p at 62, which incorporates their own connector form, such as at 64, to join the next adjacent rightward character. Generally, characters in the scriptive font are designed to truncate at an assumed concatenation height, as depicted by "h" at 66. When overlapped with a corresponding left body side of a next adjacent rightward character within a character string, the text will appear to emulate handwriting. While such a cursive type outline font may produce an output consisting of scriptive characters, the use of an assumed concatenation point for a majority of letters in a given character set does not produce a context sensitive, concatenated sequence of letter forms which truly emulates human handwriting with its many nuances.

Figure 3:
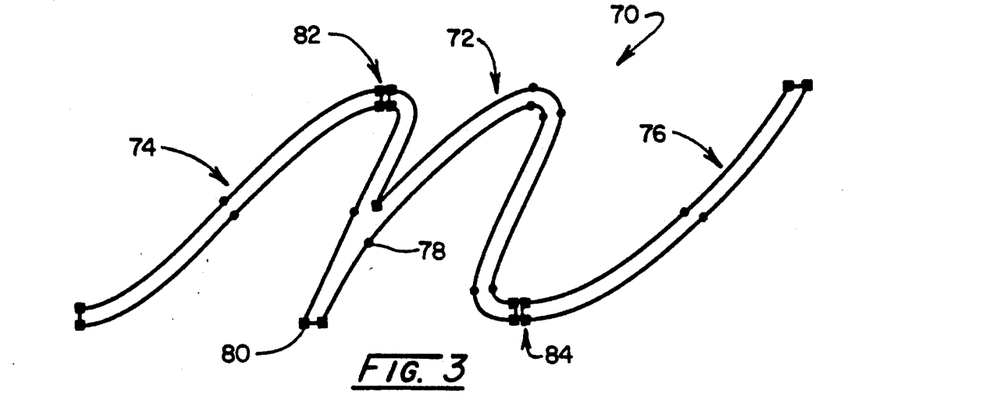
FIG. 3 is a drawing of the letter form "n" of the present invention, in outline form, showing leading and trailing connector forms and graphic control points.

Letter forms and connector forms corresponding to a computer memory resident outline font, such as depicted in FIG. 1A, are generally described mathematically as combination of stroke elements such as depicted in FIG. 3. Generation of the mathematical definitions of letter forms and their joining character counterparts may be conducted by various methods available in the art, typically by a font generating utility such as Fontographer, by Altsys. Using such a font generating utility, pre-existing type styles may be optically scanned and traced to convert each type style character into a mathematical collection of lines, arcs, and curves. Character descriptions may be generated afresh, as well.

Referring now to FIG. 3, the cursive letter form n is represented generally at 70 in unfilled, outline style, and is shown consisting of base letter form n (72) and leading overcurve type connector form 74 as well as undercurve type trailing connector form 76. Control points, such as 78, provide graphic control over a character form's stroke characteristics. Concatenation points, such as at 82 and 84, are specified during the design process for a given character or group of characters having similar concatenation attributes. Consequently, as connector forms 74 and 76 are mated with base letter form 72, a mating abutment at concatenation points 82 and 84 creates a visual representation suggesting of a single, continuous pen stroke.

Figure 4A:
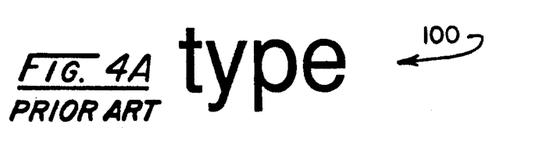
FIG. 4A is a drawing of a collection of letter forms combined to form the word "type" in Helvetica type outline font available in the prior art.
Figure 4B:
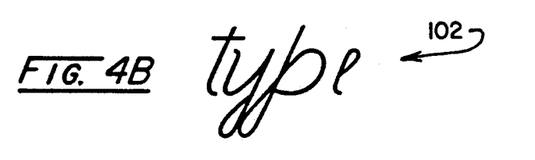
FIG. 4B is a drawing of a collection of letter forms combined to form the word "type" in Zaner Cursive type outline font according to the present invention.
Figure 4C:
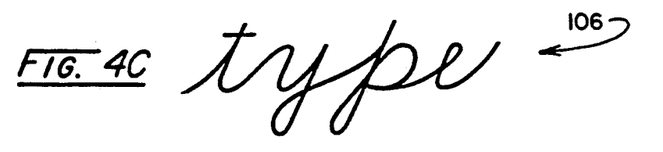
FIG. 4C is a drawing of a collection of letter and connector forms combined to form a cursively concatenated representation of the word "type" in Zaner Cursive type outline font according to the present invention.
Figure 4D:
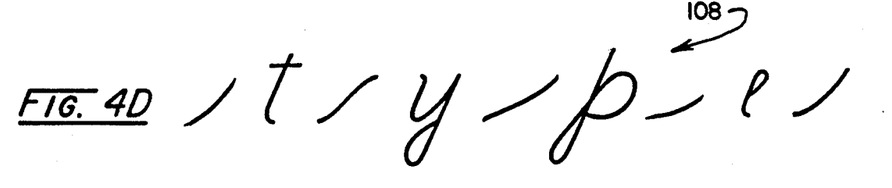
FIG. 4D is an exploded view of the collection of letter and connector forms of FIG. 4C showing the individual letter and connector forms.
Figure 4E:
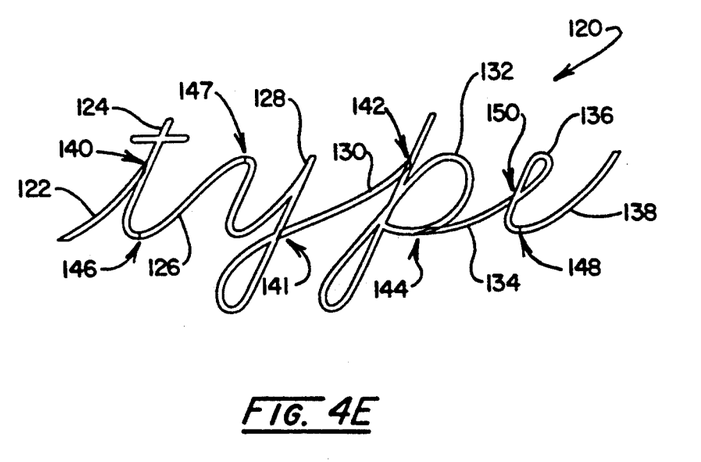
FIG. 4E is an enlarged graphical depiction of cursively joined characters of the context sensitive cursive font of the present invention showing the extent and concatenation of connectors between adjacent base character letterforms.

Referring to FIGS. 4A to 4F, the relationship between a sampling of base letter forms and connector forms of FIG. 1A, is depicted. Referring specifically to FIG. 4A, the word type is displayed at 100 in non-cursive Helvetica typeface. The equivalent letter forms from the Zaner Cursive typeface are shown in FIG. 4B. Note that this collection of letter forms alone does not form a cursive string of characters. Missing are suitable connecting strokes to join each of the adjacent letter forms. Combining the cursive letter forms t, y, p and e with the appropriate connector forms from the Zaner Cursive font shown in FIG. 1A, a cursively formed representation of the word type is formed, shown in FIG. 4C at 106. Referring additionally to FIG. 4D, the same series of letter forms and connector forms is shown at 108 in an exploded view for the purpose of pointing out the use of the font's connector forms. Referring now to FIG. 4E, the word type is shown in the Zaner Cursive type style in an unfilled, outline style at 120. There it can be seen that a leftmost undercurve connector form 122 is joined with base letter form t (124) which is, in turn, connected via overcurve type connector form 126 to subsequent base letter form y (128). Subsequently, undercurve connector form 130 joins with base letter form p (132) which is subsequently connected to base letter form e (136) via undercurve connector form 134. Finally, undercurve type connector form 138 is joined with base letter form e at 136 to end the string of characters typeset in a Zaner Cursive typeface. As can be seen from the figure, connector forms have been designed to overlap or abut the bodies of certain base letter forms at their respective left and right concatenation points such as displayed at locations 140, 141, 142, 144 and 150. Other connector forms such as 126 and 138 are shown to abut adjacent letter forms at their respective concatenation points 146, 147, and 148. It is this unique aspect of the design of the connector forms of the Zaner Cursive font shown in FIG. 1A, that permits context-sensitive typesetting using predetermined connector forms for a given pair of letter forms.

In the preferred embodiment of the invention, base letter forms and connecting forms are stored as a mathematically described outline font. However, the invention also envisions that base letter forms and connector forms may be stored as bitmapped character images, as well.

Figure 5:
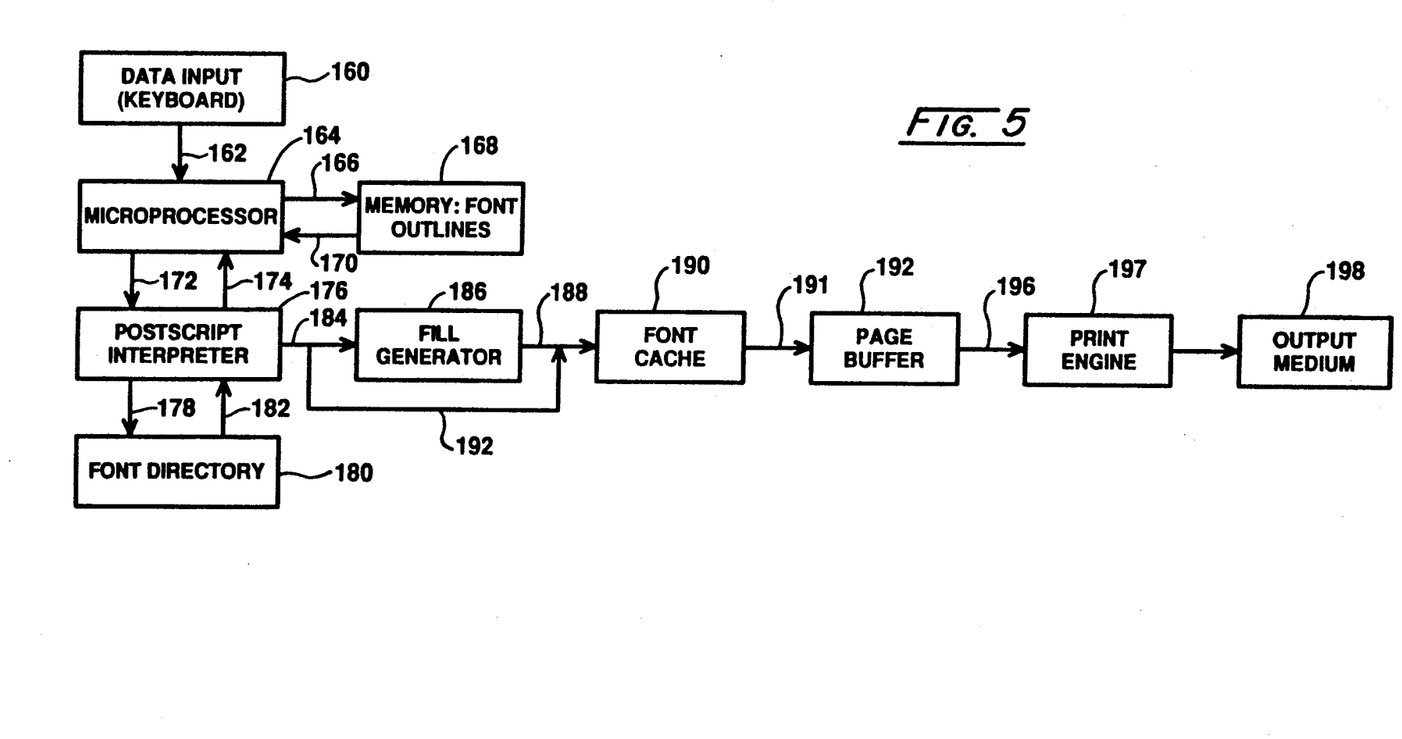
FIG. 5 is a block diagram of a high resolution, computer typesetting system typically employed as an output device by the present invention.

Referring now to FIG. 5, a PostScript page description language type printer for outputting computer memory stored outline fonts is shown in block diagrammatic form. While this system describes a printing device using Adobe's page description language, the outline font may be adapted to be output on non-PostScript printing devices, such as those employing alternative font description conventions such as TrueType from Apple Computer, as well. A data input device 160, such as a keyboard, is shown connected to microprocessor 164 as an input method for providing a sequence of signals corresponding with a desired visual output. The microprocessor 164, which may be housed within the printing device itself, accesses a memory component 168 retaining outline descriptions of fonts via memory bus 168. Such storage of font outlines at 166 may be contained in random access memory (RAM) within the printing device, on a hard disk connected to a port of the printing device (not shown), or stored by a separate computer and downloaded as a component of the character string to be printed via data bus 162. Font outline descriptions contained in memory 168 are channeled to interpreter 176 as represented by data bus 170, block 164 and bus 172. The interpreter depicted at 176 represents a process element of microprocessor 164 which translates font outlines downloaded from stored location 168 into mathematical instructions for graphical printing or displaying purposes. After the interpreter 176 has translated a given font into mathematical graphical definitions, it places them in font directory 180 via data bus 178 where they remain until recalled for use on a given page or until purged from the directory 180 by the microprocessor 164.

As the interpreter 176 begins processing a page, it searches font directory 180 for the presence of the requested font. If a requested font style is not resident within font directory 180, interpreter 176 searches through other memory sources connected to the printing device for translation and storage into font directory 180. Interpreter 176 then provides, via data bus 184, mathematical instructions defining the outline of font characters to fill generator 186. Fill generator 186 then, in turn, converts outline fonts into bitmapped images corresponding in resolution to the highest resolution of the resident printing device, typically from 300 to 2,500 dots per inch (dpi). Should an unfilled, outlined style of the outline font be desired, the process of generating a bitmap by fill generator 186 is bypassed, represented in FIG. 5 by line 192. Once bitmapped images of a particular outline font have been created by fill generator 180, they are supplied by data bus 188 to font cache 190 for storage. The font cache 190 is a dedicated portion of RAM within the printing device that retains processed bitmapped images of each size and orientation of each outline font character processed. Since the bitmapped filled character images are stored in font cache 190, they are made instantly available to the interpreter 176, which greatly speeds up processing time when a particular character is specified. Bitmapped character images stored in font cache 190 are provided to page buffer 192 through data bus 191 for assembly into a complete page to be printed. After a page has been fully assembled in page buffer 192, lines of serial data, corresponding to the maximum resolution of the output device, are sent through data bus 196 to the print engine shown in the figure as 197. The serial bit string supplied to print engine 197 through line 196 provides control instructions for the imaging system within print engine 197, typically controlling the exposure of a photosensitive drum, paper or other photographic media. The print engine 197 then outputs a visual representation on output medium 198, the type of medium dependent upon the type of printing device utilized.

Figure 1B:
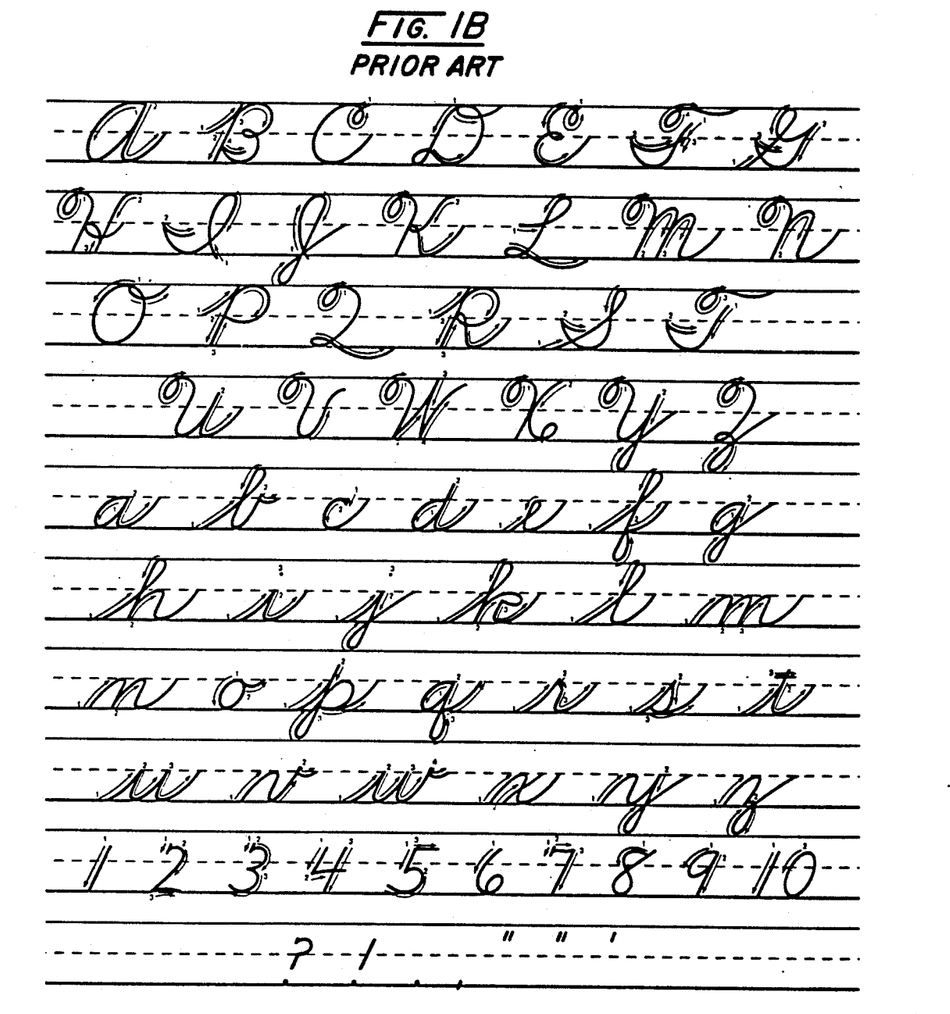
FIG. 1B is a drawing of the Zaner-Bloser instructional cursive typeface depicting numbered directional arrows.

During the development of a character font that would simulate the long established Zaner-Bloser instructional character font shown in FIG. 1B, early efforts were concentrated on developing character descriptions as artwork each having its own built-in connectors. While this first generation character font satisfactorily simulated the Zanerian handwriting method implemented this approach within a computerized system would require nine ASCII character sets to accommodate all of the character pair permutations. This would have required a corresponding increase in the amount of memory to process and store the numerous cursive font families. In an effort to reduce the required number of fonts down to an easily manageable number of one, it was determined that, with certain exceptions, all alphabetic characters within the Zaner-Bloser typeface could be categorized into predetermined families of character groups, each group containing letter forms having similar left or right side concatenation points. The two basic families of character groups, a right and a left, are displayed in Table 1.

One of the first steps in the process of selecting a suitable connector form for joining a given base letter form pair is the classification of adjacent characters by its predetermined concatenation point attributes. Concatenation refers to the point at which a cursive connector form is joined with a cursive base letter form to produce a sequential series of cursively disposed characters in a string.

Accordingly, Table 1 contains a first group of characters having "left" as family identifier, which refers to the left character of a given select character pair within an input string, comprised of character groups designated as a, b, c, g, o, p, B, H, Y, and [sp]. Alphabetic characters within an identified character group, such as character group b which contains input characters b, v, w, were recognized as having common concatenation attributes with respect to the right sides of each letter form of the Zaner Cursive font contained in the respective character groups.

TABLE 1

| 1ST (LEFT) FAMILY GROUP | | 2nd (RIGHT) FAMILY GROUP | |
| --- | --- | --- | --- |
| CHAR. GROUP | INPUT CHARACTER | CHAR. GROUP | INPUT CHARACTER |
| a | a, d, h, i, l, m, n, q, r, t, u, A, K, M, N, U | a | a, d, g, q |
| b | b, v, w | b | b, f, h, k, l |
| c | c, e, f, k, x, C, E, R | c | c, o |
| g | g, j, y, z, J, Z | e | e |
| o | o | l | i, j, p, t, u, w |
| p | p, s | m | m, n, v, x, y, z |
| B | B, D, F, G, I, L, O, P, Q, S, T, V, W, X | r | r |
| H | H | s | s |
| Y | Y | 's | 's |
| [sp] | [space] | [sp] | [space] |

Likewise, Table 1 lists a second family of character groups therein identified as a, b, c, e, i, m, r, s, 's and [sp]. As with the first family character group counterpart, the second family group is identified as containing character groups organized according to a character's left side concatenation attributes. With certain exceptions, once each character within a selected adjacent pair is identified with a corresponding left and right character group identifier, reference may be made to a pairing grid for selection of located data for employing a suitable cursive connector form. Such a pairing grid is identified as Table 2 which is seen as a matrix having its columns headed by members of the second (right) identified family group, and having its horizontal rows headed by members of the first (left) identified family of character groups.

Manual selection of a cursive connector form for joining two adjacent Zaner Cursive letter forms may be accomplished by the following procedure. For a given string of input characters, for example b e, adjacent characters must be paired and classified according to their respective left and right character groups. To facilitate leading and trailing connector forms, such as 38 and 48 from FIG. 2A, the first and final characters, within a given serial string will be treated as being preceded and followed by a space ([sp]) character respectively. So, for example, the "b e" example contains three distinct pairs of characters: the [sp], b pair; the b, e pair; and the e, [sp] pair.

Considering the [sp], b pair, reference is made to Table 1 to first classify the left space character as belonging to left character group [sp] and the right input character b being classified as belonging to character group b within the second family group. Having classified each character of the pair according to its associated character group reference is then made to the pairing grid of Table 2, wherein the left group [sp] found at the bottom of the leftmost column of left group identifiers and the b character group is found along the uppermost row of identifiers. Locating the point where the b column intersects with the [sp] row, the number 157 is found above an   (accent grave) and a u character. The numeric designator, 157, represents a unique ASCII character I.D. assigned to the cursive connector form for joining the [sp], b character pair. Note, that while each character within the Zaner Cursive font is assigned a unique ASCII I.D. number, the number value assigned and its corresponding keyboard sequence may be altered without materially affecting the effectiveness of assembling a cursively concatenated string of characters. The   and u character combination located beneath the ASCII character I.D., represents the keystroke input from a standard ASCII keyboard which, when pressed in conjunction with the "option" key on a Macintosh keyboard by Apple Computer, will produce the indicated connector character. For example, to invoke ASCII character I.D. 157, the keystroke sequence of option- +u is entered, thereby producing the leading connector form to the b character as illustrated, for example, in FIG. 2A at 38. Since the intersection of the [sp] and the b character groups in the pairing grid did not contain a √ (check mark) or § (section mark), no unique exception base letter form, as contained in cols. 16 and 18 of FIG. 1A, is indicated by the pairing grid. After the ASCII 157 connector character form has been entered, a b is then entered from the keyboard 160 or other input device, the computer screen thus displaying a b having a leading, undercurve connector stroke, as depicted in FIG. 2A at 40. Next, considering the b, e character pair, reference to Table 1 discloses that input character b is identified as a member of the left character group b, and the right input character e is associated with right character group e in the second family group. Note, as character pairs are processed in a rightward direction, a character originally a member of a right character group becomes associated with a left character group upon the next successive pairing. Referring once again to the pairing grid of Table 2, the intersection of left character group b and right character group e identifies ASCII character I.D. 145. The keyboard stroke sequence located beneath the character I.D. 145 contains a √ (check mark) after an e indicating the need to substitute a unique exception e base letter form because of its environment, here determined by the angle and concatenation point of the preceding connector form. For example, the base letter form e in a b, e combination is fundamentally different than a base letter form e in an l, e combination because of the way that the checkstroke connector form, identified as 42 in FIG. 2A, joins letter form b at 40 with letter form e at 44. Accordingly, typing option-u will produce the checkstroke connector form 42. However, rather than entering a standard e from the keyboard, an e character exception must be entered. Consequently, the keyboard sequence of option-e is entered to produce the excepted e character identified at 44 which accommodates the checkstroke connector 42. Note that the space has been inserted between the b character and the checkstroke character 42 in FIG. 2A for purposes of clarity and would not appear in the normal output unless specifically inserted.

Moving on to the third and final character pair of e, [sp], Table 1 indicates that the e input character belongs to the c left character group, and the imputed [sp] input character is identified with the [sp] right character group. Referring to the pairing grid in Table 2, it can be seen that these two character groups intersect at ASCII character I.D. 241. Entering option-L from the keyboard 160 produces trailing connector form 48.

As previously stated, subject to certain predetermined exceptions, the pairing grid may be used to manually select connector forms for joining adjacent base letter forms from the Zaner Cursive font. Certain exceptions, especially those concerning the selection of the appropriate cursive connector forms, include those exception combinations of characters depicted in Table 3 which require the entry of the alternative ASCII character I.D. or associated equivalent "option" keyboard sequence. Also, as previously noted, certain base characters need to be substituted for their standard counterpart based upon the context in which the character appears.

TABLE 2

Pairing Grid

| LEFT | RIGHT | | | | | | | | | |
|---|---|---|---|---|---|---|---|---|---|---|
| | a | b | c | e | i | m | r | s | 's | [sp] |
| a | 129 | 155 | 140 | 144 | 227 | 235 | 165 | 168 | 128 | 241 |
|   | A | no | a | ie | W | D | 8 | r | uA | L |
| b | 130 | 247 | 248 | 145 | 229 | 236 | 173 | 154 | 131 | 156 |
|   | C | M | < | ue√ | R | F | = | uo√ | eE | eu |
| c | 201 | 94 | 126 | 191 | 185 | 207 | 187 | 160 | 132 | 241 |
|   | ; | i | n | o | p | q | 9 | t | nN | L |
| g | 161 | 200 | 215 | 146 | 230 | 237 | 188 | 158 | 133 | 179 |
|   | * | §l | V | §ei | §T | G | §0 | §iu | §uO | . |
| o | 186 | 141 | 182 | 196 | 199 | 250 | 194 | 195 | 134 | 181 |
|   | b | c | d | √ | h | l | v√ | uU | m | |
| p | 174 | 206 | 217 | 147 | 96 | 238 | 203 | 183 | 135 | 244 |
|   | " | Q | ~ | 'i | ' | H | 'A | w | ea | X |
| B | 0 | 157 | 0 | 224 | 232 | 178 | 232 | 197 | 136 | 0 |
|   |   | 'u |   | & | U | , | U | x | 'a | |
| H | 153 | 0 | 249 | 225 | 152 | 240 | 205 | 214 | 137 | 245 |
|   | io |   | > | (√ | 'o | K | nO | ∧∕ | ia | B |
| Y | 177 | 0 | 166 | 226 | 251 | 204 | 216 | 190 | 138 | 246 |
|   | + |   | 7 | §) | §k | nA | §uy | §' | §ua | N |
| [sp] | 0 | 157 | 0 | 224 | 232 | 178 | 232 | 197 | 136 | 0 |
|   |   | 'u |   | & | U | , | U | x | 'a | |

TABLE 3

Connector Exceptions

| Character Combination | ASCII I.D. | Keyboard Sequence |
|---|---|---|
| f[sp] | 228 | (option-E) |
| f's | 143 | (option-' + e) |

TABLE 3-continued

| Connector Exceptions | | |
|---|---|---|
| Character Combination | ASCII I.D. | Keyboard Sequence |
| l's | 142 | (option-e + e) |
| q[sp] | 149 | (option-u + i) |
| qu | 150 | (option-n + n) |
| q's | 151 | (option-e + o) |
| yj | 139 | (option-n + a) |
| yp | 139 | (option-n + a) |

TABLE 4

| Substitute Characters | | |
|---|---|---|
| Special Character | ASCII I.D. | Keyboard Sequence |
| 3√ | 171 | (option-e) |
| s√ | 143 | (option-s) |
| g§ | 142 | (option-g) |
| j§ | 149 | (option-j) |
| qu | 150 | (option-u) |
| y§ | 151 | (option-y) |
| z§ | 139 | (option-z) |
| J§ | 139 | (option-J) |
| Y§ | 231 | (option-Y) |
| Z§ | 243 | (option-Z) |

Those unique exception base letter forms are listed in Table 4 and are designated with a √ (check mark) if the right character of a select pair changes in response to the context of the left character, or with a § (section symbol) if the left character within a select pair must be subsequently changed based upon the concatenation characteristics of its next adjacent right character. As with the joiner exceptions, substitute exception characters are recalled by entering that character's ASCII I.D. number, also listed in Table 4.

Referring now to Table 5, special substitute characters are listed for use in conjunction with certain character pairs beginning with I, O, P, and S. Again, as with the special characters contained in Table 4 and the connector form exception located data contained in Table 3, the substitute capital cursive letter forms take priority over any other cursive connector I.D. which may have been derived from pairing grid located data.

TABLE 5

| Substitute Caps | | |
|---|---|---|
| Character Pair | ASCII I.D. | Keyboard Sequence |
| Ig | 233 | (option-I) |
| Ij | 233 | (option-I) |
| Ip | 233 | (option-I) |
| Iz | 233 | (option-jI) |
| Og | 175 | (option-O) |
| Oj | 175 | (option-O) |
| Op | 175 | (option-O) |
| Oz | 175 | (option-O) |
| Pf | 184 | (option-P) |
| Pj | 184 | (option-P) |
| Pp | 184 | (option-P) |
| Sj | 234 | (option-S) |
| Sp | 234 | (option-S) |

Having disclosed a method of manually selecting cursive connectors to join adjacent cursive base letter forms, the process of selecting suitable connectors and checking for base character exceptions based on their context of use, may be achieved through employment of machine automation using an appropriate algorithm, as well. Such a system and process is most useful when converting large amounts of text to a corresponding cursively concatenated output. The process of achieving conversion through the use of an automated process offers the additional advantages of increased conversion speed while also minimizing the potential for human error.

Figure 6:
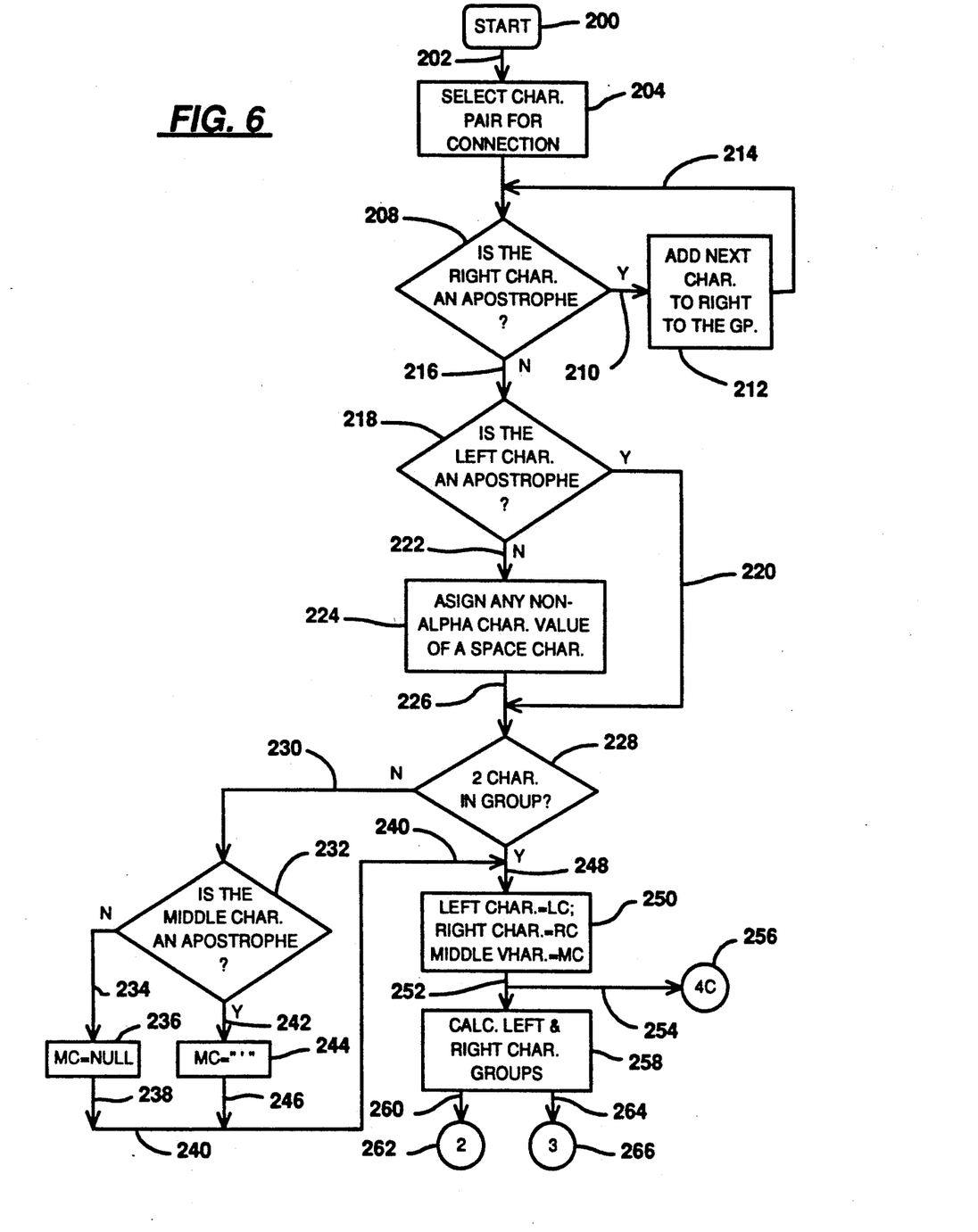
FIG. 6 is a flow chart showing the designation of elements within a selected character pair to be joined according to the present invention.

The general program under which the microprocessor 164 may carry out the selection and substitution of cursive connector and letter forms is presented in flow chart format in FIG. 6. Referring to the latter figure, the start of the main program is represented at node 200 which is shown directed via line 202 to the select character pair procedure represented at block 204. Following the selection of adjacent character pair the program proceeds via line 206 to determine whether the right character is an apostrophe character at decision block 208. In the event the right character within the pair is an apostrophe character, the routine loops through line 210 wherein the program adds the next rightmost adjacent character to the group, represented at block 212. Following selection of the next rightmost character, the program returns via line 214 to line 206 wherein the program once again looks to see if the right character within the group is an apostrophe at block 208. If the rightmost character is not an apostrophe, the program progresses as represented at line 216 to an inquiry at block 218 as to whether the left character of the pair is an apostrophe. If the answer to the inquiry is affirmative, the program loops by way of line 220 to line 226. In the event the answer to the inquiry is negative, the program advances via line 222 to block 224 wherein any non-alphabetic character within the group is treated as a space ([sp]) character. The program then continues via line 226 to an inquiry as to whether there are two characters in the string being processed at 228. If the inquiry is negative, meaning that there are three characters in the group, the program is directed along line 230 to an inquiry at black 232 as to whether the middle character is an apostrophe. If the middle character is not an apostrophe, the program advances along line 232 to block 236 wherein the middle character is assigned a null value. Once assigned a null value, the program continues on via line 238 to line 240 wherein it rejoins the main program branch at line 248. If the inquiry at block 232 was determined to be affirmative, the program, in turn, progresses via line 242 to block 244 wherein the middle character is assigned the value of an apostrophe. Having been assigned an apostrophe value, the program advances via line 246 to line 240, which is, in turn, connected to the main program at line 248. In the event the inquiry at block 228 is answered in the affirmative, i.e. there were only two characters in the string of characters being processed, the program advances via line 248 to block 250 wherein the left character is assigned a designator of LC and the right character would be assigned the designator of RC. Any middle character that may be present is assigned the designator of MC. The results of assignments of LC, RC, and MC values to the members of the string being processed is directed along lines 252 to block 258 wherein the characters within the string being processed are subsequently assigned to right and left character groups. Character designations available at line 252 are also directed by line 254 to connecting point 4C at 256 for use in a subsequent routine for determining connector exceptions. In calculating the left and right character groups, as indicated by block 258, the character designated LC is directed along line 260 to node 2 at 262, while the character designated as RC is directed along line 264 to node 3 at 266.

Figure 7:
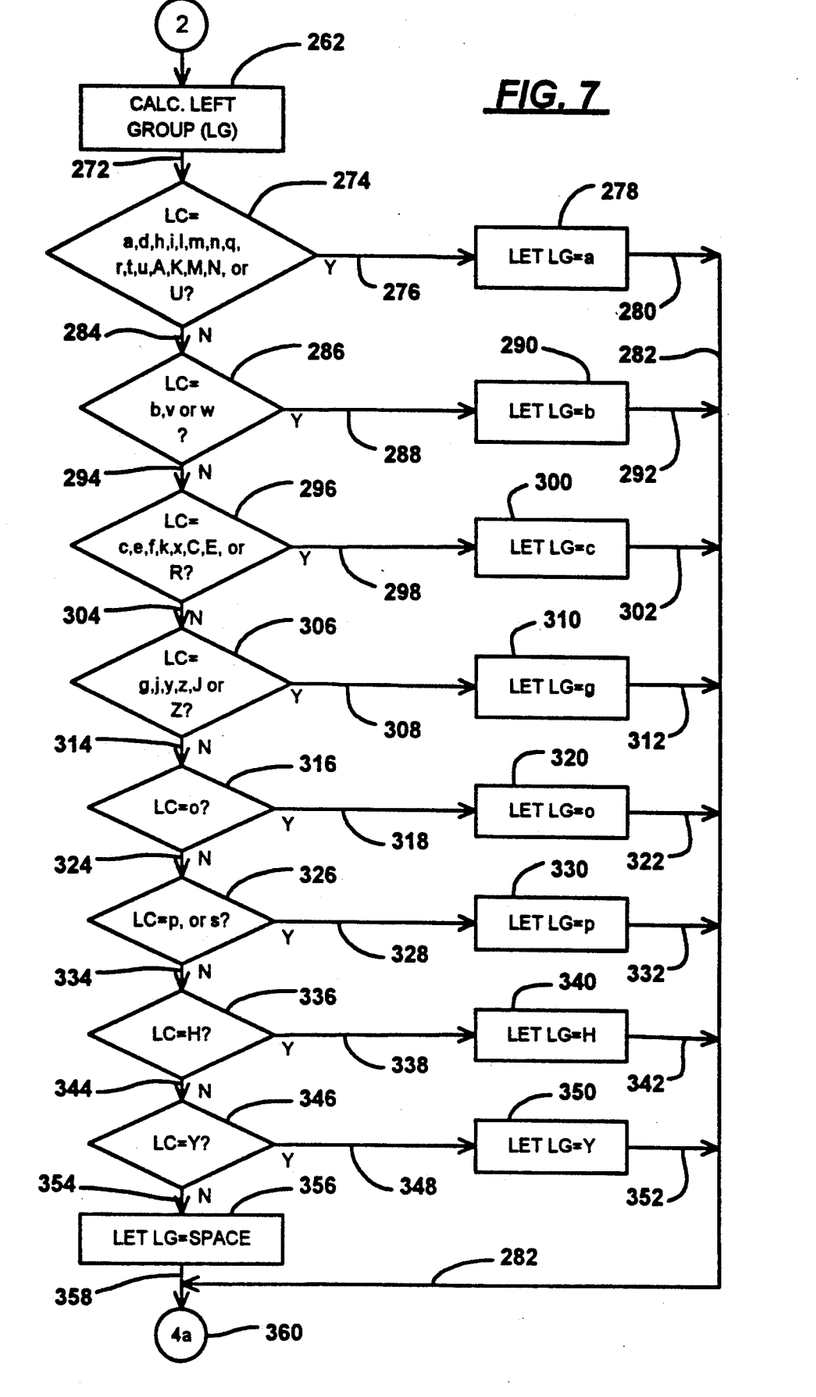
FIG. 7 is a flow chart showing the logic for categorizing the left character of a select pair according to the present invention.

Referring to FIG. 7, the character designated as LC is processed into a left character group and associated with other cursive letter forms having similar right side concatenation attributes. LC is directed along line 274 to an inquiry at block 272 as to whether LC is equal to one of the characters: a, d, h, i, l, m, n, q, r, t, u, A, K, M, N, or U. If the answer to the inquiry is affirmative, the program progresses along line 276 to block 278 wherein LC is assigned to left character group a. Once assigned to left group a, the routine then exits as represented at line 280 and node 4a at 360. However, where LC has not been identified as being a member of character group a, a determination as to whether LC is associated with left group b is made at block 286. If the answer to the inquiry is positive, the LC is assigned to left group b and the routine ends as represented by line 288, block 290, lines 292, 282, and node 360. Where LC is not associated with left group a, or b, further inquiry is made as to whether LC is associated with left group c, as represented by line 294 and block 296. If such is the case, LC is assigned to left group c and the routine ends as represented by lines 298, block 300, line 302, line 282, and node 360. If a determination has been made that the LC does not belong to left group a, b, or c, inquiry is made, as represented by line 304 and block 306, as to whether LC is associated with characters within left group g. If LC equals g, j, y, z, J or Z, the left character is assigned to left group g and the routine ends, as represented by lines 308, block 310, line 312, line 282, and node 360. If LC is not contained within those characters associated with left group a, b, c, or g, then inquiry is made into whether the LC is equal to o as represented by line 314 and block 316. If such is the case, LC is assigned to LG equals o as represented by line 318, block 320, line 322, 282, and node 360. If LC is not included within left groups a, b, c, g, or o, then inquiry is made as to whether LC is equal to p or s as represented by line 324 and block 326. If the inquiry is affirmative, then LC is assigned a left group value equal to p and the routine ends as represented by lines 328, block 330, line 332, line 282, and node 360. Should LC not be contained within those characters designated by inquiry 326 nor any previous inquiry, subsequent inquiry is made as to whether LC equals H, as represented by line 334 and block 336. Should the answer to the inquiry be affirmative, LC is assigned a left group value of H and the routine ends as represented by lines 338, block 340, line 342, line 282, and node 360. Should the inquiry at block 336 be negative, the additional inquiry is made as to whether LC equals Y, as indicated by line 334 and block 336. If the inquiry is true, LC is assigned to left character group Y and the routine ends as indicated by lines 348, block 350, line 352, line 382, and node 360. If the inquiry from block 346 is negative as well, LC is assigned the default value of left character group equal to a [sp] and the calculate left group routine ends as represented by line 354, block 356, line 358, and node 360.

Figure 8:
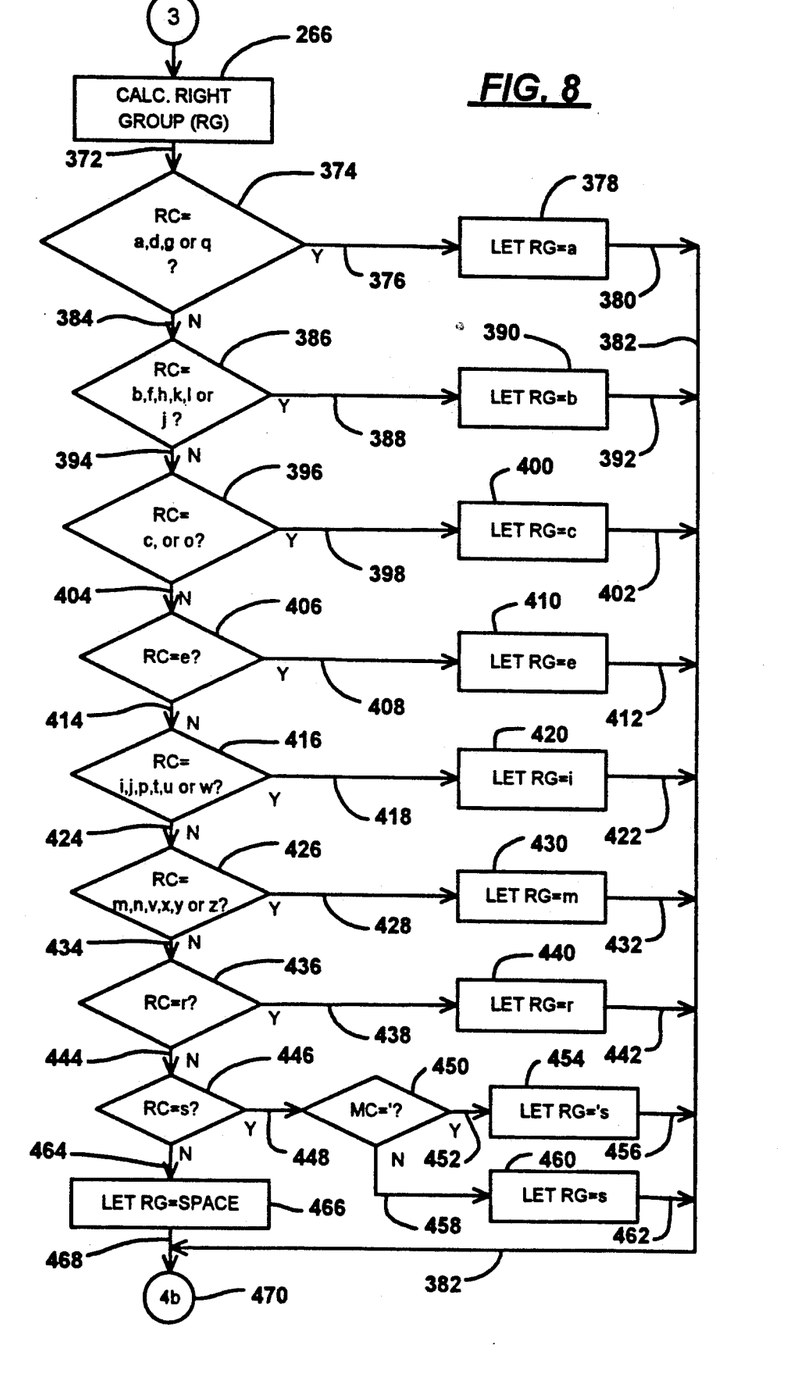
FIG. 8 is a flow chart showing the logic for categorizing the right character of a select pair according to the present invention.

After determining to which character group the left character within a select pair of characters belongs, a similar routine must be conducted to determine to which character group the next adjacent right character belongs. Referring to FIG. 8, the routine for determining the value of the right character group is disclosed. Having previously been assigned the designator RC, inquiry is made as to whether RC belongs to right character group designated a which containing the characters a, d, g, and q, as represented by line 372 and 374. If the inquiry is true, RC is assigned a right character group value of a and the routine ends, as indicated by line 376, block 378, lines 380, 382, and node 4b. If the answer to the previous inquiry is negative, RC is tested as to whether it equals a, b, f, h, k, l, or j by an inquiry represented by block 386 and line 384. If the answer to the inquiry is positive, RC is assigned a right character group equal to b and the routine ends as represented by line 388, block 390, lines 392, 382, and node 470. If RC is not contained in either of the previous inquiries, further inquiry is made as to whether RC is equal to a c or o, as represented by line 394, and block 396. If the answer to the inquiry is true, then RC is assigned to right character group equal to c and the routine ends as indicated by line 398, block 410, lines 412, 382, and node 470. If the answer to the previous inquiries is false, then additional inquiry is made as to whether RC equals the character e as represented by line 404 and block 406. Should the inquiry be true, RC will be assigned to right character group e and the routine ends as represented by line 408, block 410, lines 412, 382 and node 470. If the inquiry of block 406 is negative as well, further inquiry is made as represented, by line 414 and block 416 as to whether RC is equal to i, j, p, t, u, or w. If the inquiry is answered in the affirmative, RC is assigned to right character group i and the routine ends as represented by line 418, block 420, lines 422, 382, and node 470. If the answer to the inquiry of block 416 is negative, additional inquiry is made as to whether RC is a member of the set m, n, v, x, y, or z as represented by line 424 and block 426. If the inquiry is true, RC is assigned a value equal to right character group m and the routine ends as indicated by lines 428, 432, 382, block 430, and node 470. If the answer to the inquiry of block 426 is additionally negative, subsequent inquiry is made as represented by line 434 and block 436 as to whether RC is an r. If it is, then RC is assigned to right character group r and the routine ends as represented by lines 438, 442, 382, block 440, and node 470. If the inquiry of block 436 is negative, then an additional inquiry is made as to whether RC is equal to the character s, represented by line 444 and block 446. If the inquiry is answered in the affirmative, an additional inquiry must be made as to whether the s character is preceded by an ' (apostrophe), as represented by line 448 and block 450. If the inquiry at block 450 is answered in the affirmative, then RC is assigned to right character group 's and the routine ends, as represented by lines 452, 456, and 382, block 454 and node 470. However, if the inquiry at block 450 is in the negative, then the right character is assigned to right character group s and the routine ends as represented by lines 458, 462, 382, block 460, and node 470. Should the inquiry at block 446 additionally be negative, the RC is assigned to default right character group [sp] and the calculate right character group routine ends as indicated by lines 464, 468, block 466, and node 470.

Figure 9:
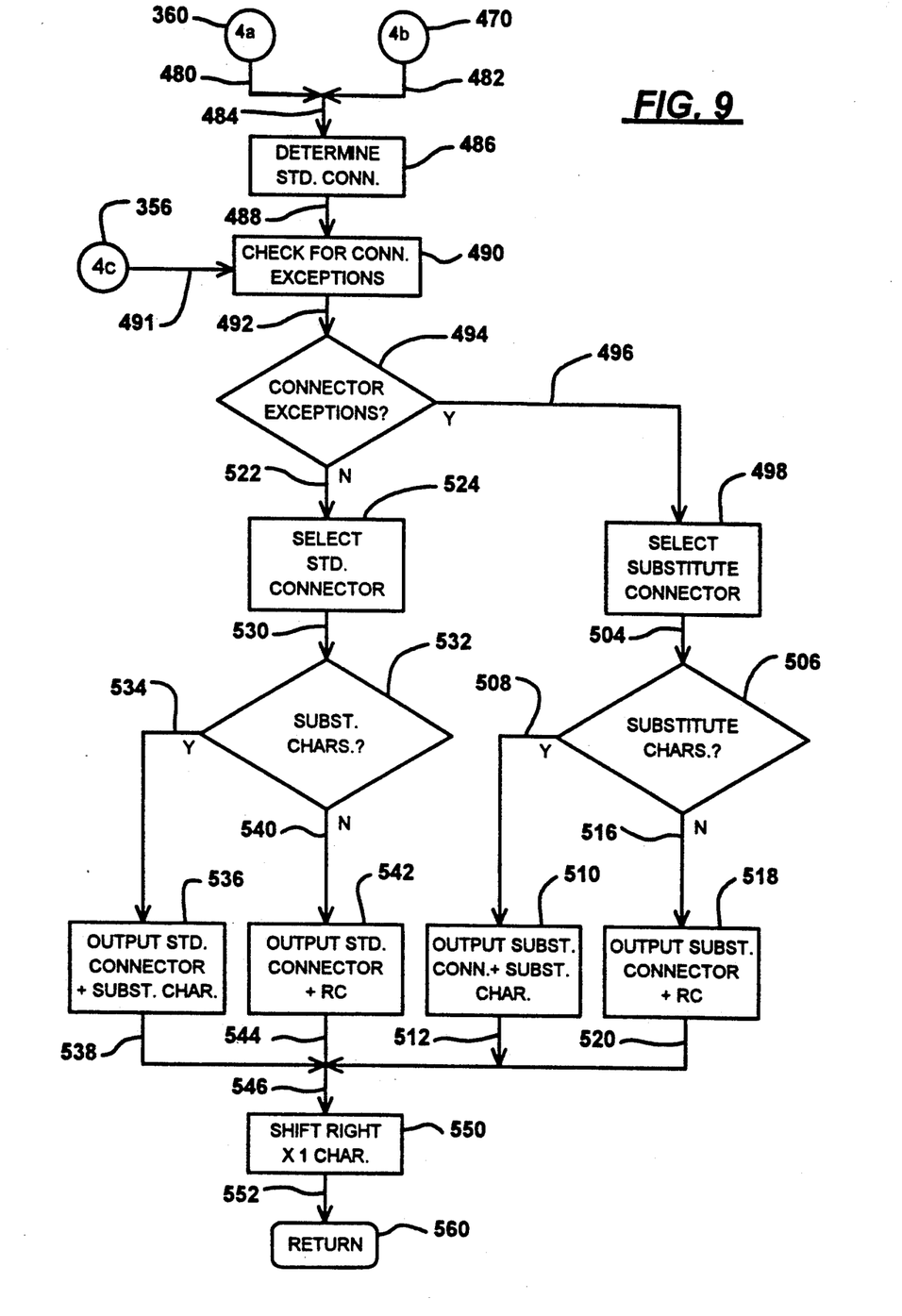
FIG. 9 is a flow chart showing the logic for selecting a context sensitive connector character for joining select character pairs, according to the present invention.

Referring now to FIG. 9, the left character group and right character groups to which LC and RC belong are presented at nodes 360 and 470 respectively. Once the group membership of the left character and right character have been provided, the program uses those character group values for addressing memory-retained connector form identifications as represented by lines 480, 482, 484, and block 486 for locating data determining a standard connector. Once a cursive connector form, corresponding with the left character group and right character group has been determined, a comparison is made with another computer memory component to determine whether or not a character exception should be substituted for the selected connector, represented by line 488 and block 490. Node 4c at 256 is shown as providing block 490 with information representing the LC, RC and MC values by way of line 491. If the block 490 identifies an exception combination of left and right characters, exception located data is indicated and a predetermined connector form will be substituted. Should a connector exception be determined, as represented by line 492, block 494, and line 496, the routine will select the substitute connector at block 498 which supersedes the standard connector previously determined at block 486. Following the selection of a substitute connector, a determination must be made as to whether or not the context of the characters requires a substitution of the base letter forms themselves. This inquiry is represented by line 504 and block 506, wherein memory-resident predetermined character pairs are searched for a matching with the current select pair. If a match is found, the need to substitute character is indicated, and the substitute connector and substitute character are output, as represented by line 508, block 510, and line 512. After the character and connector have been output, a shift register containing the character string shifts to the right by one character and the routine returns to the start node 200, as represented by lines 546, block 550, line 552, and node 560.

Should the inquiry from block 506 be negative, then the substitute connector and the cursive letter form represented by RC is output, as represented by line 516, block 518, and line 520. After the character and connector have been output, a shift register containing the character string being processed shifts to the right by one character and the routine returns to start node 200, as represented by lines 546, block 550, line 552, and node 560. If, however, there was no connector exception and the answer to inquiry at block 494 was negative, the standard connector determined in block 486 would be selected for printing, as represented by line 522 and block 524. Following selection of a standard connector for joining letter forms corresponding to LC and RC, inquiry is made as to whether either LC or RC should be substituted based upon the contextual relationship between the adjacent characters. This decision is represented by line 530 and block 532 and references memory-retained predetermined character pairs for determining whether substitute characters are indicated. If the answer to inquiry at block 532 is true, the routine will output the standard connector selected in block 524 and the exception base letter form derived as a result of inquiry at block 532 as represented by line 534, block 536, and line 538. After the character and connector have been output, a shift register processing the character string shifts right by one character and the routine returns to the start as represented by lines 546, block 550, line 552, and node 560. Should the inquiry of block 532 be negative, however, and no substitute characters are indicated by the memory-retained predetermined character pairs, the standard connector selected in block 524 is output along with the cursive letter form corresponding to the value of RC as represented by line 540, block 542, and line 544. Once the character and connector have been output, a shift register containing the character string shifts right by one character and the routine returns to the start as represented by lines 546, block 550, line 552, and node 560 for processing the next pair of adjacent characters.

Since certain changes may be made in the above-described system and method without departing from the scope of the invention herein involved, it is intended that all matter contained in the description thereof or shown in the accompanying drawings shall be interpreted as illustrative and not in a limiting sense.

I claim:

1. A system for forming a visually perceptible context sensitive cursively concatinated sequence of font characters from a string of input characters, comprising:
   an electronically accessible computer employable memory, including:
   a first memory component retaining definitions for printed formation of base letter forms,
   a second memory component retaining definitions for printed formation of connector forms,
   a third memory component retaining a first family of character groups associated with respect to common said connector forms in adjacency with and to the left of another character; and
   a fourth memory component retaining a second family of character groups associated with respect to common said connector forms in adjacency with and to the right of another character;
   an input providing a sequence of input signals identifying a said string of input characters;
   a processor responsive to said input signals for accessing said third and fourth memory components to locate data representing the presence of mutually adjacent ones of said input characters within said first and second families of character groups, for accessing said second memory component to derive a said definition of a said connector form corresponding with said located data, for accessing said first memory component to derive a definition of a said base letter form for each of said mutually adjacent ones of said input characters, and for deriving output signals corresponding with a cursively concatenated sequence of said derived definitions of said base letter forms and said derived definition of said connector form; and
   an output responsive to said output signals for providing a cursively concatenated visual representation corresponding with said mutually adjacent ones of said input characters.

2. The system of claim 1 in which said definitions of base letter forms correspond with characters of non-context-sensitive form.

3. The system of claim 1 wherein each character within each character group of said first family retained by said third memory component has common concatenation attributes for connective association with one of said connector forms with respect to a character located within a said character group of said second family retained by said fourth memory component.

4. The system of claim 1 wherein each character within each character group of said second family retained by said fourth memory component has common concatenation attributes for connective association with one of said connector forms with respect to a character located within a said character group of said first family and retained by said third memory component.

5. The system of claim 1 in which each said character group within said first and second families is represented by respective first and second family identifiers; and said located data is derived from a compiled pairing of said first and second family identifiers.

6. The system of claim 1 in which said third memory component retained first family contains the three character groups comprising the characters:
a, d, h, i, l, m, n, q, r, t, u, A, K, M, N, U;
b, v, w; and
c, e, f, k, x, C, E, R.

7. The system of claim 1 in which said third memory component retained first family contains the three character groups comprising the characters:
g, j, y, z, J, Z;
o; and
p, s.

8. The system of claim 1 in which said third memory component retained first family contains the four character groups comprising the characters:
B, D, F, G, I, L, O, P, Q, S, T, V, W, X;
H;
Y; and
space.

9. The system of claim 1 in which said fourth memory component retained second family contains the three character groups comprising the characters:
a, d, h, g, q;
b, f, h, k, l; and
c, o.

10. The system of claim 1 in which said fourth memory component retained second family contains the three character groups comprising the characters:
e;
i, j, p, t, u, w; and
m, n, v, x, y, z.

11. The system of claim 1 in which said fourth memory component retained second family contains the four character groups comprising the characters:
r;
s;
's; and
space.

12. The system of claim 1 in which said electronically accessible memory includes a fifth memory component retaining a compilation of exception combinations of adjacent characters and corresponding definitions for the printed formation of unique exception connector forms; and
said processor is responsive to the occurrence of a said exception combination within said string of input characters to access said fifth memory component for a corresponding said definition for the printed formation of a unique exception connector form.

13. The system of claim 12 in which said compilation of exception combinations of adjacent characters comprises:
f space, f's, l's, q space, q u, q's, y j, and y p.

14. The system of claim 1 in which said electronically accessible memory includes a sixth memory component retaining a compilation of exception said located data and uniquely corresponding definitions for the printed formation of exception base letter forms; and
said processor is responsive to the occurrence of said exception located data to derive a said uniquely corresponding definition for the printed formation of an exception base letter form.

15. The system of claim 1 in which the sum of said letter form and connector form descriptions retained in said first and second memory components does not exceed 256.

16. The method for forming a printed sequence of cursively concatenated font characters corresponding with a given string of characters, comprising the steps of:
providing a first compilation of cursive base letter forms;
providing a second compilation of cursive connector forms;
providing a third compilation of a first family of character groups in which the characters therein are uniquely associated with respect to common connector forms in adjacency with and to the left of another character;
providing a fourth compilation of a second family of character groups in which the characters therein are uniquely associated with respect to common said connector forms in adjacency with, and to the right of, another character;
identifying the presence of each character within said given string of characters within character groups of said first and second families and deriving data corresponding with a said identified presence;
selecting a said base letter form from said first compilation for the characters of said given string;
selecting a said cursive connector form in correspondence with said derived data for pairs of adjacent characters within said given string of characters; and
combining each said selected base letter form and said corresponding selected connector form to provide a cursively concatenated print-out of said given string of characters.

17. The method of 16 in which said first compilation of cursive base letter forms are provided as outline definitions.

18. The method of 16 in which said second compilation of cursive connector forms are provided as outline definitions.

19. The method of 16 in which said first family of character groups are combined with said second family of character groups within a matrix from which said data are derived.

20. The method of claim 16 which includes the steps of:
providing a fifth compilation of exception combinations of pairs of adjacent characters and corresponding unique exception connector forms; and
combining each said selected base letter form of the pair thereof corresponding with a said exception combination with a said unique exception connector form.

21. The method of claim 16 which includes the steps of:
providing a sixth compilation of exception said data and uniquely corresponding exception base letter forms; and
selecting a said exception base letter form as said selected base letter form on the occurrence of said exception data.

22. The method of claim 16 in which the sum of said first and second compilations does not exceed 256 forms.

* * * * *